May 25, 1971 A. GLAZE 3,580,783
METHOD OF PRODUCING MULTITUDINOUS STRAIGHT
CUT-TO-LENGTH FILAMENTS IN ORIENTED FORM
Filed Jan. 4, 1968 3 Sheets-Sheet 2
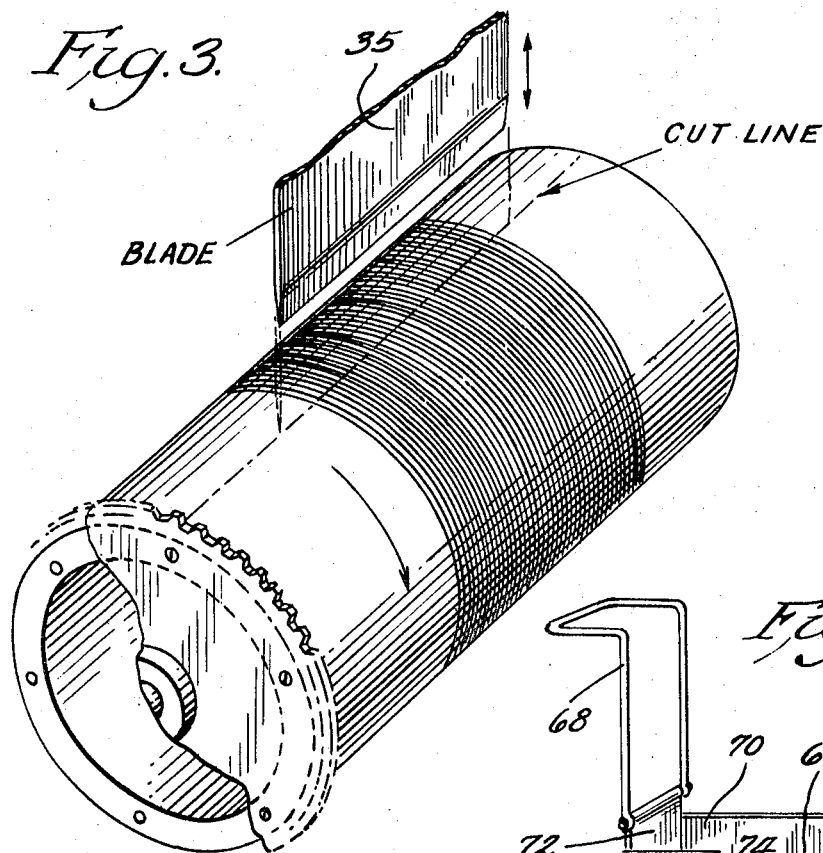
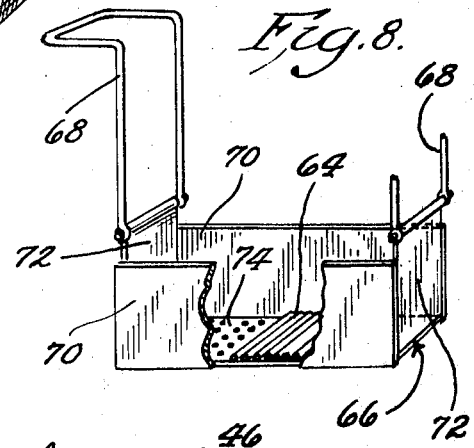
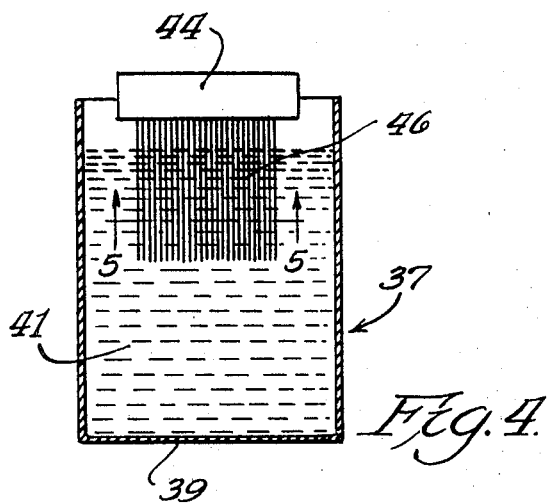
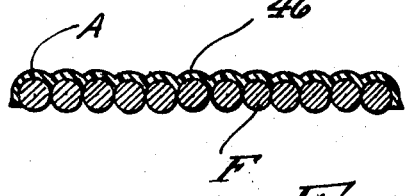
Inventor
Ardelle Glaze
By Mann, Brown & McWilliams
Attys.

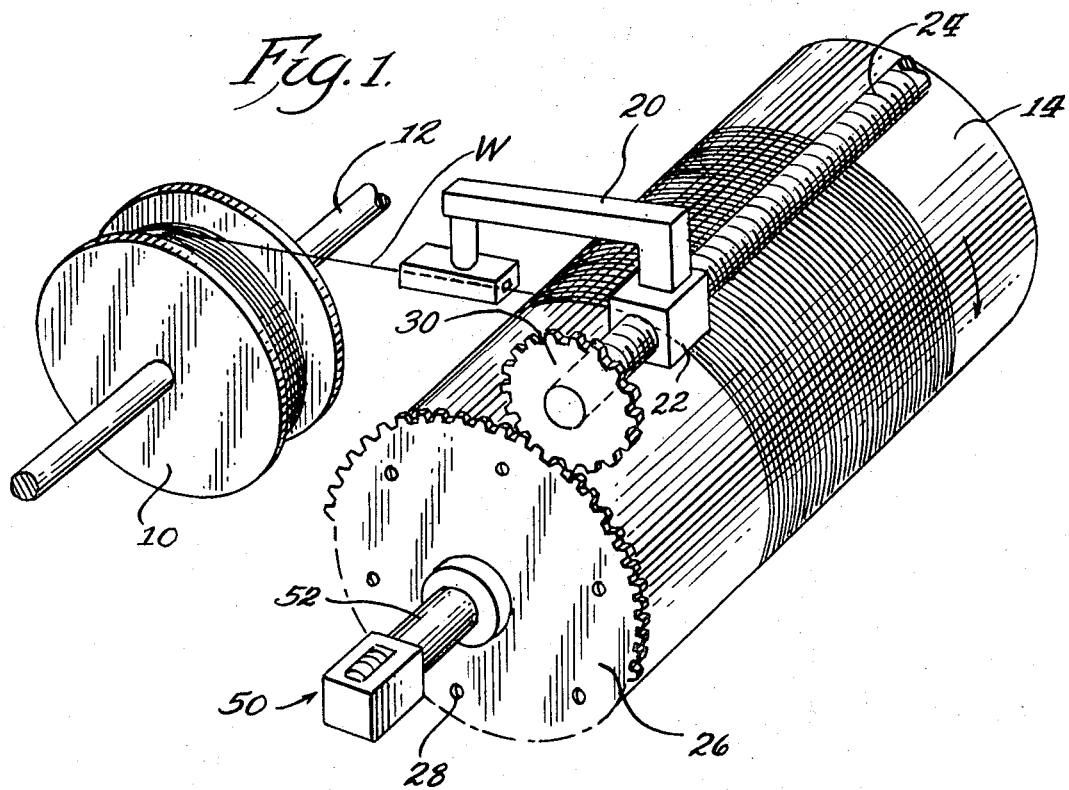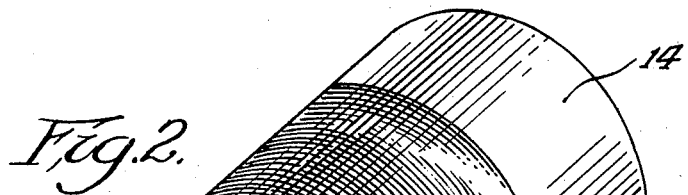

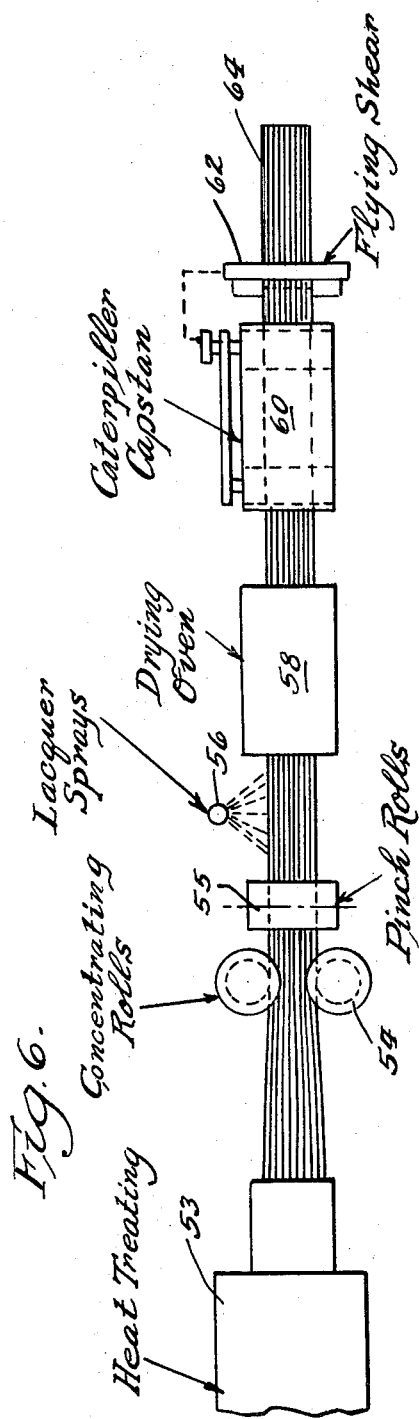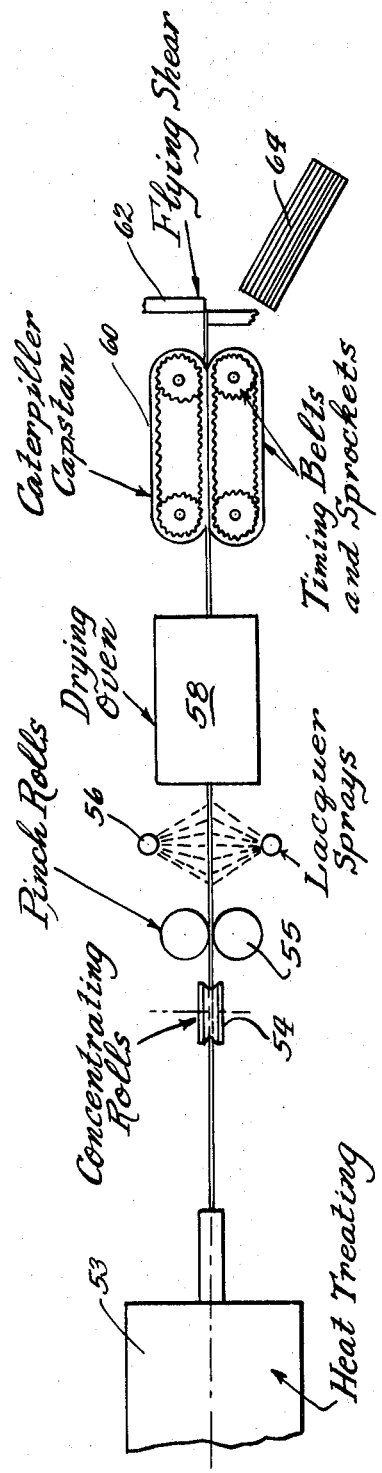

United States Patent Office 3,580,783
Patented May 25, 1971

3,580,783
METHOD OF PRODUCING MULTITUDINOUS STRAIGHT CUT-TO-LENGTH FILAMENTS IN ORIENTED FORM
Ardelle Glaze, Fort Wayne, Ind., assignor to Fort Wayne Metals, Inc.
Filed Jan. 4, 1968, Ser. No. 695,633
Int. Cl. B31c 11/02
U.S. Cl. 156—426
1 Claim

ABSTRACT OF THE DISCLOSURE

Small diameter wire which has been prestressed is arranged in a plurality of substantially parallel or otherwise oriented strands which are bound together by a readily removable adhesive and thereafter cut to desired size. The adhesive binding the individual, cut strands together may or may not be removed to provide either a plurality of prearranged strands of wire bound together into nonwoven cloth or a mass of individual strands oriented in parallel or other relationship.

BRIEF SUMMARY OF THE INVENTION

Fine metallic wire has a multitude of uses such as for making brushes, non-woven cloth or sheet material, in the fabrication of parabrakes, paragliders and inflatable cells, suturing wire, catalytic material for use in chemical reactions, reinforcement for plastics and ceramics, space energy reflectors (electronic clouds) and metal wicking to convey fluids and vapors. When formed into non-woven cloth, the material may be used for filters, as core supports for nickel-cadmium batteries, brake linings when impregnated, bearings when impregnated, high temperature gaskets, fuel cell membranes, acoustical sound absorption, catalytic planes for chemical aids, reinforcement for high strength, low volume sheet and shape forms, ornamental or decorative panels, spark suppression, in the fabrication of parabrakes, paragliders, inflatable cells, rubber tires, and in the preparation of high strength laminates.

The method of the present invention permits wire having a diameter as small as 0.0005 inch or finer to be oriented and cut to length through the combination of available equipment. As a consequence, the method of the present invention permits the manufacture and handling of oriented, pre-cut bunches of very thin filaments which may be stored, packaged or handled without the problems normally inherent in such functions.

The present invention provides a unique concept in the manufacture of fine wire filaments in oriented, cut-to-length bunches or groups.

While prior practice involved such expensive and time-consuming procedures as cutting individual filaments and attempting to orient them and group them in a suitable container until used, the present invention provides greatly simplified preparation and handling of predetermined numbers of wire filaments in an oriented group by bonding the oriented filaments together before cutting. The method of the present invention is particularly effective in the use of magnetism or other like aids in the orientation of the extremely fine pre-cut filaments.

It is an object of the present invention to provide a method of producing straight cut-to-length filaments in predetermined quantities and in oriented form.

It is another object of the invention to provide a method of producing the oriented filaments characterized hereinafter in such a manner that they may be readily handled, packaged, stored and subsequently used without concern for possible disorientation, misplacement or loss of even one filament of a group.

The foregoing, as well as other objects and advantages of the present invention will appear more fully from a study of the following detailed specification taken in conjunction with the drawings, wherein:

BRIEF DESCRIPTION OF THE DRAWINGS

FIG. 1 is a perspective view showing the winding of a pre-straightened round or flat wire on a Teflon-coated drum;

FIG. 2 is a perspective view of the drum of FIG. 1 illustrating the application of a suitable adhesive material to the wire wound thereabout;

FIG. 3 is a perspective view of the drum of FIG. 1 illustrating the cutting of the wire;

FIG. 4 is a schematic representation of a group of pre-oriented, cut-to-length wire filaments from which the adhesive is being removed;

FIG. 5 is a cross-section of the preoriented filaments taken along 5—5 of FIG. 4 and illustarting the general condition of the group of filaments upon being removed from the drum;

FIG. 6 is a diagrammatic plane view of a continuous method for forming a plurality of oriented filaments and cutting the filaments into desired lengths while bonded together in the oriented state;

FIG. 7 is an elevational view of the apparatus shown in FIG. 5; and

FIG. 8 is a perspective view of a wire basket for use in removing adhesive from the bonded wire filament strands.

DETAILED DESCRIPTION

While the present invention is herein disclosed in detail with respect to what is now believed to be the preferred embodiment thereof, the disclosure of the invention in this matter is by way of illustration, and it is not intended that the invention is to be limited solely to the specific embodiment disclosed. On the contrary, the invention embodies all alternatives and equivalents falling within the spirit and scope of the appended claim.

With reference now to the drawings, the basic steps of the novel method of the present invention are illustrated particularly in FIGS. 1, 2 and 3. A pre-straightened hard wire or spool of soft wire W, which has been drawn or rolled to provide a particular dimension, which for purposes of the present description, may be in the range of .010 inch to .0005 inch or finer, or .006 inch x .010 inch or finer, is wound for storage on a spool 10. The spool is mounted for rotation on a suitable support such as shaft 12 adjacent a rotatable Teflon-coated drum 14. It will be appreciated that the drum may be a part of a lathe or any comparable piece of equipment which would have the capability of rotating the drum at a controlled speed. Where pre-straightened hard wire is rolled, the diameter of the drum should be large enough so that the elastic limit of wire is not exceeded during winding. If dead soft annealed wire is rolled it is necessary to roll-restraighten it to restore the "wire plane" to a flat state. It will also be appreciated that, for purposes of clarity, the figures of the drawing are schematic, and equipment such as the lathe, other turning equipment, or wire equipment has been excluded for purposes of simplifying and clarifying the drawings.

The wire W is fed tangentially onto the drum where it is wound into a helix having a predetermined pitch. In order to permit the wire to be wound at a controlled pitch, thereby providing a specified number of turns per unit axial length of the drum, a suitable feed arrangement is provided which includes a feed guide 20 mounted on a base 22. The base 22 is threaded onto a lead screw 24. The lead screw is provided with a predetermined number of threads per inch or decimal inches of feed per revolution and the base 22 engages the threads, and is thus caused to travel over the screw when the same is rotated. In order to provide timed rotation of the guide 20, a gear 26 is fastened to the drum in any suitable manner such as by screws 28. The gear engages a pinion 30 which is secured to the end of the lead screw 24 so that when the drum is rotated, the gear 26 drives the pinion 30, causing the lead screw to rotate and the guide 22 to traverse the axial length of the drum.

By alternately reversing the traverse direction and proceeding in the manner just described, a predetermined number of turns of wire and layers of winding are disposed on the surface of the drum in a neatly oriented fashion, each turn being immediately contiguous to or spaced a predetermined distance from the next adjacent turn on the drum.

In order to retain orientation of the wire wound on the drum, and to facilitate the handling of the wire in subsequent stages of manufacture, a suitable adhesive is applied in a thin layer over the surface of the wire on the drum after winding each layer. In the particular case illustrated, a spray gun 33 is employed to apply a lacquer, or other suitable adhesive which will not adhere to the Teflon coating, over the surface of the wires wound on the drum. Because of the fineness of the wire, only a very thin layer of adhesive need be applied. Although FIG. 5 of the drawings illustrates an enlarged cross-sectional view of a series of oriented wire filaments F in closely juxtaposed relation with the adhesive coating indicated at A disposed over the surface, they may be spaced apart at predetermined distances determined by the timing mechanism. The adhesive is sufficiently strong to retain the spaced filaments F in oriented form throughout future handling thereof. Should it be deemed desirable to do so, it will be appreciated that once the filaments are cut to length, an additional coating of adhesive may readily be applied to the side of the filament group, such as that illustrated in FIG. 5, which was not exposed to the applied layer while the wires were wound on the drum.

With reference to FIG. 3, once the wire has been wound and coated in the manner described heretofore, it may be cut to any predetermined length by use of a suitable blade 35 to form a transverse cut across the wound wire at the cut line and after the "wire plane" is removed from the drum it may be cut on a bench shear to shorter desired lengths.

The blade 35 is parallel to the drum and reciprocable for purposes of severing the wire disposed thereon. In such circumstances, the drum may be rotated to cut position after application of the adhesive to the wire wound on the drum and the sheet of bonded wire will separate from the drum as a flat sheet or "wire plane." This product may be handled as an ordinary sheet material. Thus the wires may be cut to any length on a regular bench shear.

Once the sheets have been cut into the desired lengths, there is provided a predetermined number of perfectly oriented and easily handled wire filaments. By virtue of the adhesive layer previously applied, the filaments may be stored flat, or in vials, or in any other suitable fashion. They may be handled for purposes of manufacturing into an end product such as a surgical brush or other product as before mentioned with less complication than might otherwise be expected if the wires were free to move in response to air currents or other disturbing influences which readily affect wires of such small diameters.

At any time after being cut, the adhesive may, in accordance with the invention, be removed from the surface of the filaments so as to permit them to resume their individual character. This may be accomplished through the use of a solvent bath such as that indicated generally at 37 in FIG. 4 wherein a tank 39 containing any suitable adhesive solvent such as acetone 41 is employed, and a suitable holder device 44 is employed to grippingly engage one end of a group of cut filaments, which, for purposes of illustration, have been given the identifying character 46. Ultrasonic agitation of the solvent will expedite removal of adhesive.

Again referring to FIG. 1, in order to enhance the control and accuracy of the filament count, a counting device indicated generally at 50 is attached by any suitable shaft 52 to the drum to thereby indicate the number of revolutions that the drum has traveled, which, of course, will permit the precise number of filaments desired in a group to be achieved.

Referring now more particularly to FIGS. 6 and 7, the numeral 53 represents a heat treating furnace through which are fed a plurality of strands of wire which have been reduced to the desired fineness of the order of .001 inch diameter. In the heat treating furnace the wire is straightened by heat and tension and then passes between concentrating rolls 54 where the wires under tension are squeezed into juxtaposition with each other. From the concentrating rolls 54 the plurality of strands of wire are then passed through pinch rolls 55 which force the wires into a single horizontal plane. From the pinch rolls the wires, which have now been oriented into a single plane in juxtaposition to each other, are sprayed from above and below with lacquer or other suitable adhesive by means of spray heads 56 and then passed to the drying ovens 58 where the solvent is removed from the lacquer and bonding of the strands takes place. From the drying oven 58 the bonded strands are passed between the upper and lower belts of the caterpillar capstan 60, the belts being timed to move at a predetermined rate in relation to flying shear 62 so that the resulting sheet of bonded wire strands is cut into finished planes 64 of the desired length.

When a suitable stack of planes 64 has been accumulated they may be placed in a cleaning basket 66 (FIG. 8). Basket 66 is designed to be hung in an ultrasonic cleaning tank by means of hangers 68. The basket is formed with sides 70 and ends 72 spaced to accommodate the stack of planes of bonded wires so that the stack fits snugly within the basket. The bottom of the basket 74 is perforated. By subjecting the bonded strands of wire to ultrasonic vibration in the presence of a solvent such as acetone, the solvent dissolves the lacquer or other adhesive and frees the individual strands of wire which remain in their oriented position. The strands of wire are preferably subjected to a plurality of clean solvent baths to effectively remove all the adhesive from the wire strands. The mass of free strands in parallel or other oriented position can then be removed and packaged for further use or sale.

As an example of preparing wire by the drum-winding method shown in FIGS. 1 to 3, stainless steel wire which has been reduced to .001 inch diameter was heat-straightened and wound on a Teflon (polytetrafluoroethylene) coated drum having a diameter 5¼ inches. The feed screw setting was .002 inch with the result that 500 wires per inch were wound on the drum with a plane width of 2 inches and a total number of wires per layer of 1,000. After the first layer was wound or drawn it was spray-lacquered and allowed to dry. Four more layers were similarly wound each on top of the other, each layer being spray-lacquered and dried before winding the next. After the wound wire was substantially dry it was cut with a knife through all five layers at right angles to the direction of the wires and the entire mass of bound wire was removed from the drum to form a flat plane about 2 inches wide by 16 inches long. It was then allowed to dry and cure completely. This sheet was then cut by bench-type hand-operated metal shears into ⅝ inch lengths. Twenty-five of these ⅝ inch length sheets were placed in the basket such as that shown in FIG. 2 which was suspended in an ultrasonic cleaning tank containing acetone for twenty minutes. The basket was removed from this tank and immersed in four succeeding acetone tanks and subjected to further ultrasonic cleaning to remove any dissolved lacquer. The residual solvent was then removed from the wires by placing the basket on a warm plate to evaporate the solvent. The free wires were then carefully removed from the basket and packaged.

As another example, instead of spraying the entire wire wound on the drum with lacquer as in the previous example, the wires were bonded together with epoxy resin only in the area where the wires were to be cut and the epoxy-coated resin areas were reinforced with a stiff member such as a strip of metal or plastic placed on each side of the cut-line prior to cutting. The wires were then cut as in the previous example to form a plurality of parallel wires tensioned between two stiff members.

This frame of wires can be used as spark chamber grids or spark planes, electrostatic grids for ionic filters, electrified insect planes or for magnetic cords and tapes.

As an example of using the invention in the preparation of non-woven cloth, wire strands bonded together either on the drum or in the continuous manner, are cut into sheets of desired length and alternate sheets are superimposed over the next lower sheet at an angle of 90 degrees or any other desired angle. One or more sheets can thus be superimposed on the other and thereafter ultrasonically welded through the bonding medium. The bonding adhesive may or may not thereafter be removed as desired, depending upon the use to which the wire cloth is to be put. If the wire cloth is to be impermeable, the bonded matter will be left on the wire and in such case a plastic, preferably having a high melting point, would be used. If the wire cloth is to be used as a filter or for other purpose where a permeable cloth is desired, the adhesive will be removed from the cloth as in the manner previously described.

Having now disclosed the preferred embodiment of the invention, I claim:

1. Apparatus for preparing a plurality of wire strands in oriented relationship comprising:
    means for automatically arranging a plurality of wire strands in substantially parallel relationship in a single plane, said means including a power rotatable drum, timed spacing means for feeding wire onto the drum, means for moving the strands in a longitudinal path at a predetermined speed while exerting tension thereon sufficient to keep the individual strands straight but insufficient to break the strands, concentrating rolls on each side of said path spaced from each other a distance equal to the desired width for the plurality of strands, and pinch rolls above and below the plurality of strands to force the strands into a substantially single plane;
    means for applying adhesive to said wires, while held in said plane, in sufficient quantity to bind the wires together; and
    means for severing the bonded wire strands into planes of the desired length.

References Cited
UNITED STATES PATENTS

| | | | |
|---|---|---|---|
| 2,628,655 | 2/1953 | Bitterli et al. | 156—425 |
| 2,998,048 | 8/1961 | Sittel | 156—380 |
| 3,104,191 | 9/1963 | Hicks, Jr. et al. | 156—433 |
| 3,236,711 | 2/1966 | Adler | 156—426 |
| 3,391,048 | 7/1968 | Dyer et al. | 156—433 |

CARL D. QUARFORTH, Primary Examiner

B. H. HUNT, Assistant Examiner

U.S. Cl. X.R.

156—425, 429, 430, 433